Aug. 8, 1967
C. L. SCHULER
3,335,339
HIGH VOLTAGE RECTIFIER
Filed March 19, 1965
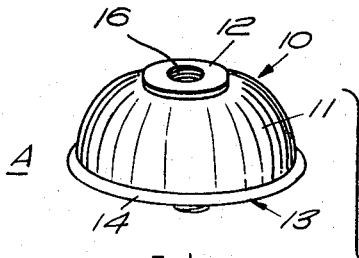
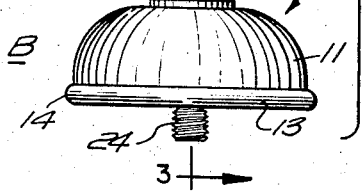
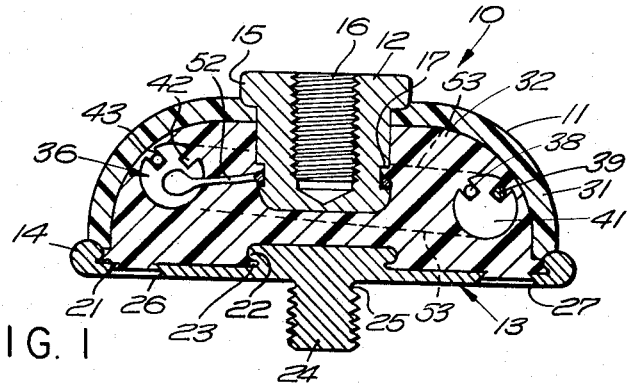
FIG. 1
FIG. 3
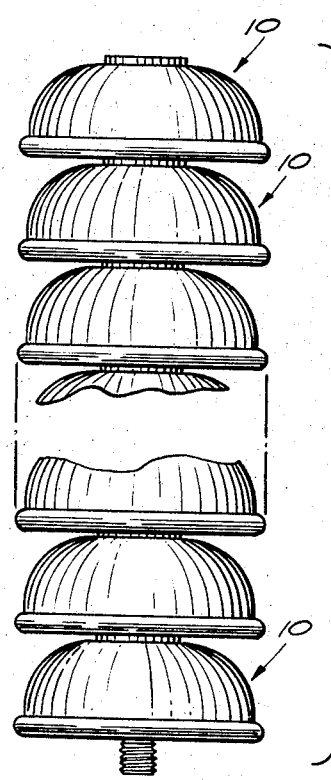
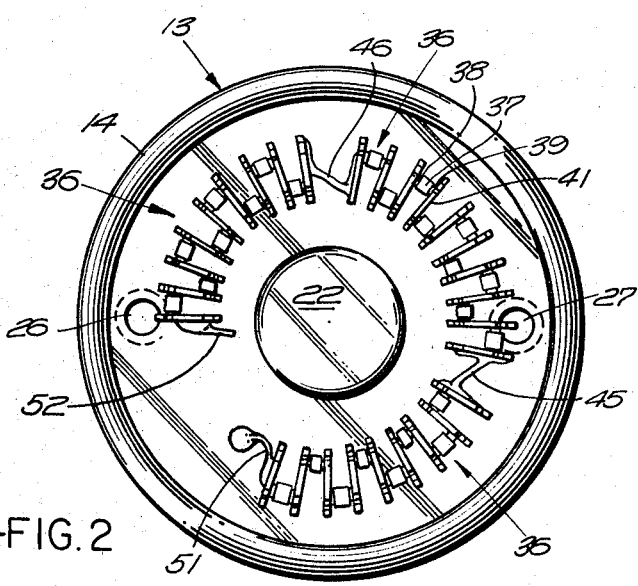
FIG. 2
FIG. 4
INVENTOR.
CHESTER L. SCHULER
BY
*Weingarten, Orenbuch & Lahive*
ATTORNEYS

United States Patent Office 3,335,339
Patented Aug. 8, 1967

3,335,339
HIGH VOLTAGE RECTIFIER
Chester L. Schuler, Wayland, Mass., assignor to Unitrode Corporation, Watertown, Mass., a corporation of Maryland
Filed Mar. 19, 1965, Ser. No. 441,048
9 Claims. (Cl. 317—234)

ABSTRACT OF THE DISCLOSURE

This invention concerns a modular high voltage electrical rectifier having an axially symmetric, generally hemispherical body of insulating material between a pair of electrical terminals; one a small diameter conductive polar cap, the other, a larger diameter conductive base provided with a corona reducing smoothly rounded external edge. The rectifying circuit is encapsulated within the insulating material and is connected internally in series with the cap and base.

---

The present invention relates in general to electrical energy conversion apparatus, and more particularly concerns a novel high voltage rectifier.

While the art of electrical rectifiers is highly developed and embraces such varied devices as vacuum tubes, gaseous discharge tubes, and the newer solid state semiconductor diodes, rectification at high voltage still presents a number of troublesome problems to the circuit design engineer. For example, the hot cathode vacuum tube still commonly used in many systems, requires special high voltage insulation for operating the heater supply at a suitable potential above ground, while the unwieldy shape of the tube introduces a variety of difficulties where it is required to suppress corona discharge. The advent of silicon semiconductor rectifiers which are characterized by low forward impedance and the ability to withstand relatively high peak inverse voltages, has made possible high voltage rectifiers that combine high electrical efficiency over a long-life expectancy with exceptional resistance to shock vibration and other environmental conditions which hitherto imposed severe limitations on the applicability of vacuum and gas filled tubes. The recent introduction of fast recovery silicon diodes has enhanced the utilization of rectifiers not only at high voltage but also at high frequencies; however, despite the many advantageous properties of these devices, conventional solid state high voltage rectifiers are beset by major limitations on reliability, efficiency and utility because of awkward and inconvenient packaging techniques available.

To withstand voltages exceeding the rating of an individual semiconductor diode, it is customary to make a high voltage solid state rectifier by assembling a number of individual diodes in series to form a "string." At power line frequencies, inherent stray capacitance and electrostatic forces are of little consequence where equipment is being designed for operation in the range of 600 volts or less. As the rated voltage increases, factors which were previously negligible are rapidly magnified and affect not only the selection of the individual rectifier components but also the geometry, insulating medium, and the means for dissipating power losses. With operating voltages in the range of 15–150 kilovolts, problems of corona, electrostatic forces and charging currents must be solved in order to contain the energy involved.

In the past, series strings of semiconductor diodes have been packaged in cylindrical dielectric cartridges because the cylindrical shape is advantageous for high voltage use due to the increased anti-corona radius at the dielectric surface. In addition, efforts were made to avoid sharp corners, projections, and surface discontinuities to minimize destructive ionization. Encapsulating techniques have been applied wherever possible to increase dielectric strength and resistance to breakdown in a particular environment. As a rule, however, cylindrical cascaded diode devices have been unsuitable for proper operation at very high potentials.

Certain compensating techniques have been developed to extend the voltage range of series connected solid state rectifiers. Often, each diode in the string is shunted by a relatively high resistor to maintain an appropriate voltage distribution under static conditions, and by a capacitor for stability under severe transients. Series resistors and capacitors impose new problems on the packaging designer, while reducing electrical efficiency and simultaneously increasing power dissipation. In one conventional arrangement, high voltage diode strings are assembled on dielectric circuit boards, which may be encapsulated to improve resistance to breakdown and atmospheric effects.

The present invention has as its primary object the provision of a high voltage electrical rectifier packaged to minimize external surface voltage gradients and corona discharge, with maximum cooling, reliability and power conversion efficiency.

More specifically, the novel rectifier of this invention is packaged as a substantially hemispherical module arranged to facilitate series stacking with like modules to increase, at the circuit designer's option, overall operating voltage up to magnitudes of 150 kilovolts or greater An internal series string of semiconductor diodes is distributed for most effective cooling with low electrostatic stress. Sufficient capacitive shunting is available to establish uniform voltage division across the rectifier over a wide range of operating frequencies without shunt resistors, and to protect the diodes against sharp electrical transients. The package is economical and rugged, and the rectifier is equally adaptable to operation in air or liquid coolant. Complex and unusual manufacturing techniques are not required, and the materials and parts required pose no special procurement problems.

Other objects and advantages of the present invention will be better understood from the following detailed description when read in connection with the accompanying drawing in which:

FIG. 1A and FIG. 1B comprise two exterior views of the novel high voltage rectifier;

FIG. 2 is a side elevational view of a stacked series arrangement of a number of high voltage rectifiers of the type illustrated in FIG. 1;

FIG. 3 is a cross-sectional view of the novel high voltage rectifier taken through the axis of symmetry 3—3 of the device as illustrated in FIG. 1B; and FIG. 4 is a top view of a partial assembly of the novel high voltage rectifier illustrated in FIGS. 1 and 3, with the upper terminal and insulator omitted for clarity.

Referring now to the drawing and more particularly to FIG. 1 thereof, two external views of the novel high voltage rectifier 10 are presented. As is apparent, the rectifier 10 is of modular construction and, more specifically, comprises an axially symmetric, somewhat flattened hemispherical insulator 11 terminated at its opposed axial ends by a pair of electrically conductive terminals 12 and 13. A rectifier circuit, to be described in considerable detail below, is arranged wholly within the insulator 11 and connected in series therein between terminals 12 and 13.

From the external configuration of the overall rectifier package, it may be seen that terminal 12 provides a relatively small diameter planar cap for the flattened polar portion of hemispherical insulator 11, while lower terminal 13 appears as a thin circular disc which provides a planar, coaxial base for the device. Terminal 12 projects slightly beyond the outer surface of insulator 11 and its upper surface is essentially parallel to the circular lower surface of disc-shaped terminal 13. The outer diameter of terminal 13 is greater than the maximum diameter of hemispheric insulator 11, the peripheral edge 14 of terminal 13 being a smooth, outwardly turned bead of substantially semicircular cross-section.

For further discussion of the structural configuration of this device, reference is now made to FIGS. 1 and 3 from which it may be seen that terminal 12 is a cylindrical member which extends axially into the rectifier package. At its upper end, terminal 12 is formed with an external circular flange 15 which permits accurate positioning with respect to insulator 11 during assembly. Terminal 12 is also provided with an internally threaded axial bore 16 and a recessed groove 17 in the central region of the module.

Turning specifically to terminal 13 as shown in cross-section in FIG. 3, the outer peripheral beaded edge is undercut internally at 21, while at its center terminal 13 is provided with both an inwardly extending cylindrical projection 22, undercut at 23, and an external axial stud projection 24 threaded to mate with an internal thread of the size tapped into bore 16 of terminal 12. It should be noted that the axial length of stud 24 is somewhat less than the axial length of threaded bore 16, and that the upper end thread on stud 24 is relieved at 25 to facilitate tightening of stud 24 into a mating member. Two small countersunk openings 26 and 27 (also illustrated in FIG. 4) useful in the fabrication of the device complete the structure of terminal 13.

The hemispheric insulator 11 of the rectifier is formed of a molded thin outer shell 31 having the external geometry previously described. Shell 31, which encloses the rectifying circuit, is filled with solid insulating encapsulant 32, entirely free from air bubbles or other void spaces, and as is evident, encapsulant material 32 extends into groove 17 of terminal 12 and into undercut regions 21 and 23 to securely engage all elements of the device and provide a rugged, solid package which is particularly insensitive to shock and vibration.

Rectification is derived from a circuit arrangement 36 embedded in the solid encapsulant medium 32. More specifically, this circuit comprises a plurality of individual diodes serially connected in a string disposed around the axis of symmetry of the device, the ends of the rectifying string being connected internally to terminals 12 and 13. With reference to FIG. 4, the embodiment disclosed employs substantially identical solid state diodes 37 each having a pair of conductive end leads 38 and 39 extending from an enclosed solid state rectifying junction, preferably silicon.

Mechanical support and electrical connection for diodes 37 is furnished by a plurality of thin circular copper discs 41 which, as shown in FIG. 3, are each provided with a pair of angularly spaced radial notches 42 and 43 for receiving the diode leads. In assembly, all of the diodes 37, poled as appropriate for unidirectional series current flow, are brazed, soldered, or otherwise electrically secured within notches of adjacent discs 41. An assembly fixture (not shown) may be employed to permit fabrication of the rectifier string such that the discs 41 fall into the generally radial arrangement shown in FIG. 4. The diodes required for the series string may be assembled as one unit, or, as shown in FIG. 4, the diodes 37 and the respective discs 41 may be assembled in smaller sections, three such sections being shown in FIG. 4, with lead wires 45 and 46 providing the necessary electrical series connection. Since notches 42 and 43 are angularly separated as shown in FIG. 3, adjacent diodes 37 are alternately closer or further from the central axis within the final assembly, as in FIG. 4. This distribution of diodes 37, together with the inherently high thermal conductivity of copper discs 41, have the effect of minimizing temperature gradients within the insulator 11, when encapsulated as shown in FIG. 3.

The diode string, as pre-assembled on discs 41, is placed within the device prior to encapsulation, with lead wire 51 connecting one end of the string to the interior surface of terminal 13, while lead wire 52, shown in both FIGS. 3 and 4, electrically joins the opposite end to terminal 12 within groove 17. To further minimize thermal gradients and enhance cooling through the large exposed areas of insulator 11 and the terminals 12 and 13, the diode string is disposed in helical fashion about the axis of symmetry. Observe that within terminal 12 at a voltage higher than at terminal 13, the diodes 37 which are at the higher potential in the string are closer to terminal 12, while the diodes 37 at the lower potential are closer to terminal 13. In this manner, the helical arrangement of diodes 37 also serves to minimize electrostatic gradients within the device. Broken lines 53 shown in FIG. 3, representing the upper and lower outlines of discs 41 have been included to illustrate the helical distribution of diodes and discs within the enclosed volume.

In the assembly process, the final step in the vacuum filling of the internal volume with encapsulant 32 through openings 26 and 27 in terminal 13. Both the pre-molded shell 31 and the liquid encapsulant are preferably an identical low electrical loss epoxy; thus, solidification of encapsulant 32 assures a solid structure with the desired absence of voids.

The novel rectifier module 10 offers certain unique electrical characteristics which will now be considered. The flattened hemispherical outer surface of insulator 11 provides excellent voltage gradient control between terminals 12 and 13, while the large diameter of terminal 13 with its semicircular peripheral outer edge 14 affords minimum coronal discharge at the high voltages contemplated together with optimum cooling effect. Although the diameter of the individual solid state diodes 37 may be relatively small, the closely-spaced supporting discs 41 significantly relieve electrostatic stresses from the individual diodes by effectively increasing the electrical cross-sectional diameter of the diode string.

Note was made above internal cylindrical projection 22 formed on terminal 13. As is readily apparent from FIG. 3, the confronting circular faces of terminal 12 and projection 22 define an electrical capacitor, with encapsulant 32 as a dielectric medium, shunting the entire diode string between terminals 12 and 13. This capacitive shunt effectively absorbs sharp electrical transients across the series diode string, and eliminates any need for individual shunting resistors or capacitors across diodes 37, as mentioned in relation to prior art techniques.

The number of diodes 37 employed in the series string within the novel rectifier is of course dependent upon the proposed maximum operating voltage and upon the peak inverse voltage characteristics of the individual diodes 37 selected for use. The number of diodes actually required may be determined simply by dividing the anticipated peak inverse voltage by the rated peak inverse voltage of an individual diode 37. The current rating of the rectifier package will be that determined by the ability of the package to dissipate thermal losses.

Typically, rectifier packages as shown in the drawing having a base diameter of approximately two inches with an overall height, not including stud 24, of approximately three-fourths inch, may be made available with peak inverse voltage ratings of 2.5–15 kilovolts, with average forward currents of between 2.0–0.3 amperes, respectively. Considerable flexibility is available and peak ratings may be increased by operating the device in a commercially available coolant such as askerol, silicone or mineral oil, Freon, or sulphur hexafluoride. The materials used for insulator 11 may be selected from many which are fully compatible with the customary cooling media.

A feature of the present invention resides in the provision of the internal thread in terminal 12 and the externally threaded stud 24 on terminal 13. FIG. 2 illustrates a plurality of devices such as shown in FIG. 1 bolted together in a series stack to provide a rectifier for extremely high voltage operation. If, for example, ten modules rated at 15,000 peak-inverse-volts are joined in series as shown in FIG. 2, a rectifier rated at 150,000 peak-inverse-volts is obtained in an exceedingly compact, rugged structure. Notwithstanding the exceedingly high rated voltage, energy dissipation, voltage gradient and coronal discharge problems are maintained under control at safe values. Due to its compact nature, the entire series string is readily enclosed within a transformer casing, thus permitting the designer to take advantage of the liquid coolant normally found in such applications.

From the foregoing, it will be apparent that the novel rectifier disclosed herein furnishes the system designer with a convenient, efficient solid state device for numerous applications in high voltage energy conversion. Many modifications within the scope of the present teachings may now be suggested to one skilled in the art; accordingly, it is intended that the invention described herein shall be limited only by the spirit and scope of the appended claims.

What is claimed is:

1. A rectifier for electrical energy conversion at relatively high voltage comprising, an axially symmetric, smoothly and continuously curved, generally hemispherical package of insulative material having a pair of axially spaced conductive electrical terminals, one of said terminals providing a relatively small diameter planar cap for the polar portion of said package, the other providing a relatively large diameter planar base therefor, and a rectifying circuit arrangement disposed wholly within said package and connected serially between said terminal pair.

2. A rectifier for electrical energy conversion at relatively high voltage comprising, an axially symmetric, smoothly and continuously curved, generally hemispherical package of insulative material having a pair of axially spaced conductive electrical terminals, one of said terminals providing a relatively small diameter planar cap for the polar portion of said package, the other being a disc slightly larger in diameter than the circular base portion of said package and providing a base therefor, the outer peripheral edge of said disc being rounded to minimize coronal discharge therefrom, and a rectifying circuit arrangement encapsulated within said insulative package and connected serially between said terminals.

3. A modular rectifier for electrical energy conversion at relatively high voltage and adapted for stacked serial connection to like modules comprising, an axially symmetric, smoothly and continuously curved, generally hemispherical package of insulative material having a pair of coaxially spaced conductive electrical terminals, one of said terminals providing a relatively small diameter planar cap for the polar portion of said package and formed with an internally threaded coaxial bore, the other providing a relatively large diameter planar base therefor and formed with an outwardly extending correspondingly threaded coaxial stud, a rectifying circuit arrangement disposed wholly within said package and connected serially between said terminals, said coaxial bore and said coaxial stud respectively permitting rigid coaxial conductive attachment to the opposite terminal of a like rectifier module.

4. A modular rectifier for electrical energy conversion at relatively high voltage and adapted for stacked serial connection to like modules comprising, an axially symmetric generally flattened, smoothly and continuously curved, hemispherical solid package of insulative material having a pair of axially spaced conductive electrical terminals, the first of said terminals being a generally cylindrical member providing a relatively small diameter planar cap for the central polar portion of said package extending coaxially into said package and terminating in a circular planar surface, the second of said terminals being a generally circular disc shaped member providing a planar coaxial base for said package and formed with an outwardly curved peripheral edge having a diameter slightly larger than the base diameter of said insulative material, said second terminal being further formed with an inwardly extending coaxial cylindrical projection having a substantially planar circular surface confronting said inner planar surface of said first terminal thereby providing a predetermined electrical surge reducing capacitance, and a rectifying circuit arrangement encapsulated within said package and serially connected therein between said first and second terminals.

5. A modular rectifier in accordance with claim 4 wherein said rectifying circuit arrangement comprises a plurality of serially connected solid state diodes disposed about said axis of said package.

6. A modular rectifier in accordance with claim 4 wherein said rectifying arrangement comprises a plurality of serially connected solid state diodes arranged in substantially helical fashion about said axis of said package.

7. A modular rectifier in accordance with claim 4 wherein said first terminal is provided with an internally threaded axial bore, and wherein said second terminal is provided with an outwardly extending correspondingly threaded coaxial stud.

8. A modular rectifier in accordance with claim 4 wherein said rectifying circuit arrangement comprises a plurality of serially connected solid state diodes, and a conductive disc disposed transversely between each adjacent pair of rectifier elements for uniformly distributing thermal losses throughout said insulative material and for substantially increasing the effective electrical diameter of said serially connected rectifiers for reducing electrical gradients in said package.

9. A modular rectifier in accordance with claim 4 wherein said package of insulative material is formed of a relatively thin outer insulative shell uniformly filled with low electrical loss insulative encapsulating medium, said first and second terminals being formed with means ensuring rigid mechanical attachment to said encapsulating medium.

References Cited

UNITED STATES PATENTS

| | | | |
|---|---|---|---|
| 2,980,828 | 4/1961 | Eggers | 317—234 |
| 3,188,549 | 6/1965 | Schuler | 317—234 X |
| 3,238,426 | 3/1966 | Berstein | 317—234 |

FOREIGN PATENTS

| | | |
|---|---|---|
| 616,963 | 1/1949 | Great Britain. |
| 838,039 | 6/1960 | Great Britain. |
| 878,590 | 10/1961 | Great Britain. |

JOHN W. HUCKERT, *Primary Examiner.*

A. M. LESNIAK, *Assistant Examiner.*